June 2, 1931.  F. A. LUNDAHL  1,808,310
VEHICLE TOY
Filed April 22, 1927    4 Sheets-Sheet 1
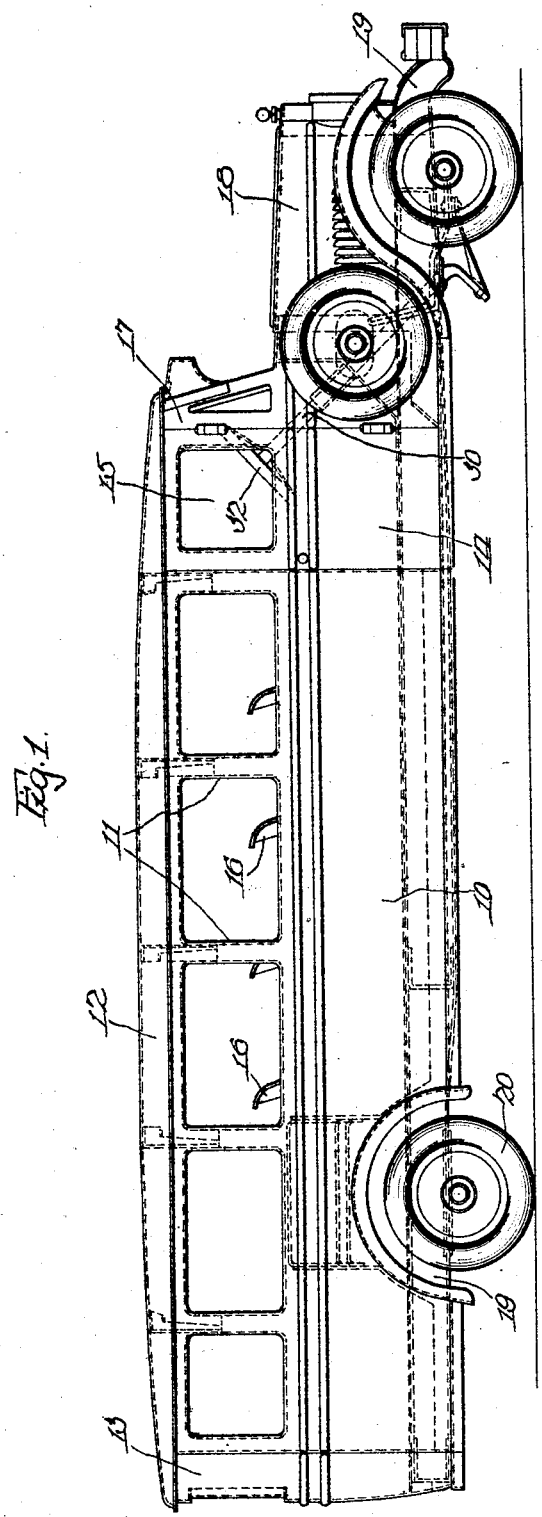

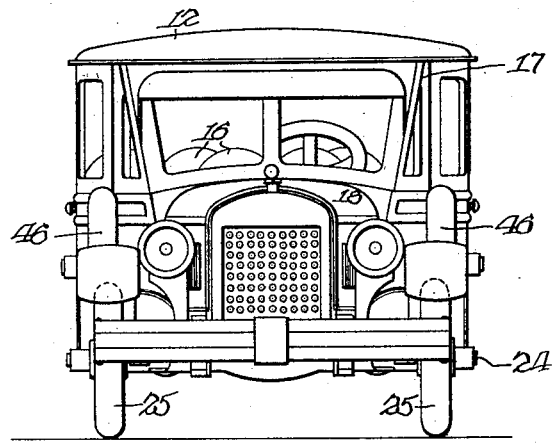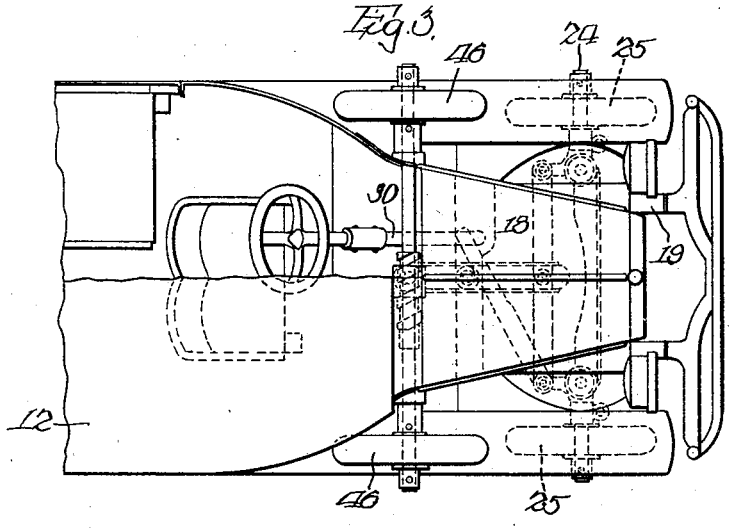

June 2, 1931.     F. A. LUNDAHL     1,808,310
VEHICLE TOY
Filed April 22, 1927    4 Sheets-Sheet 3
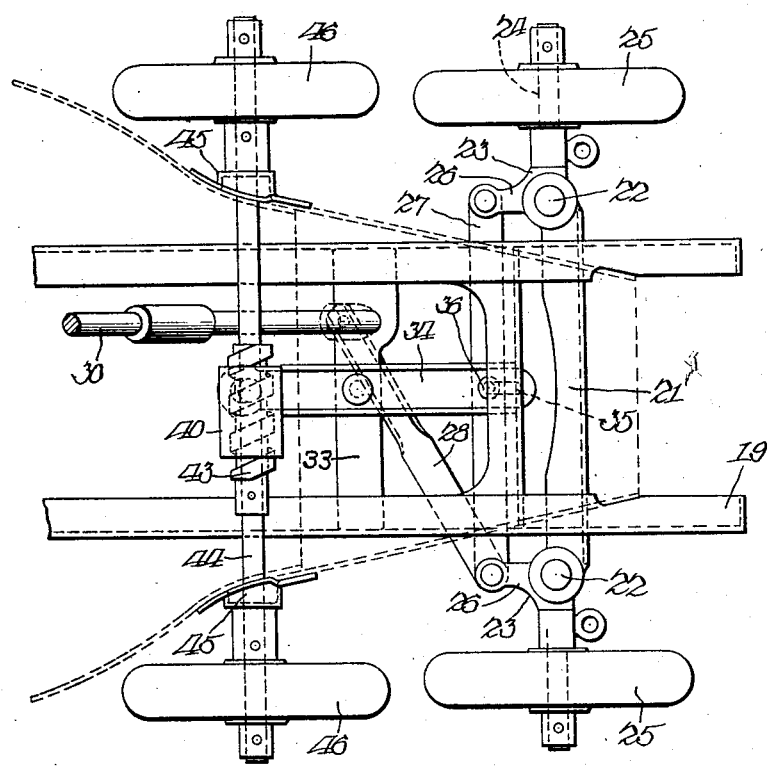
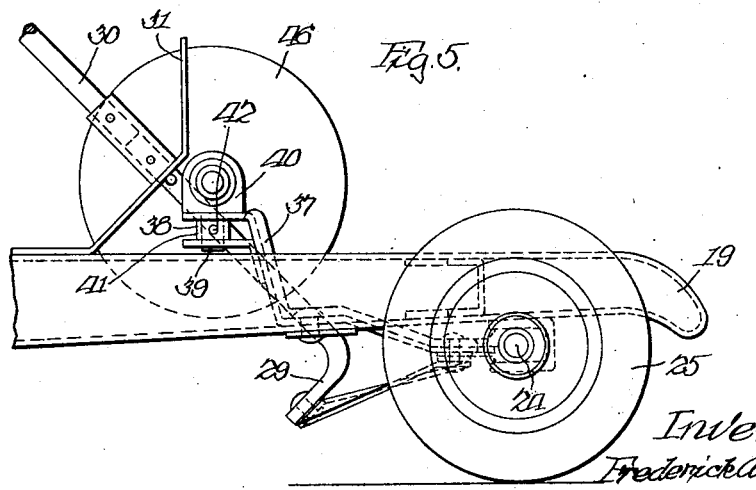
Inventor:
Frederick A. Lundahl
George I. Haight
Atty.

June 2, 1931. F. A. LUNDAHL 1,808,310
VEHICLE TOY
Filed April 22, 1927  4 Sheets-Sheet 4
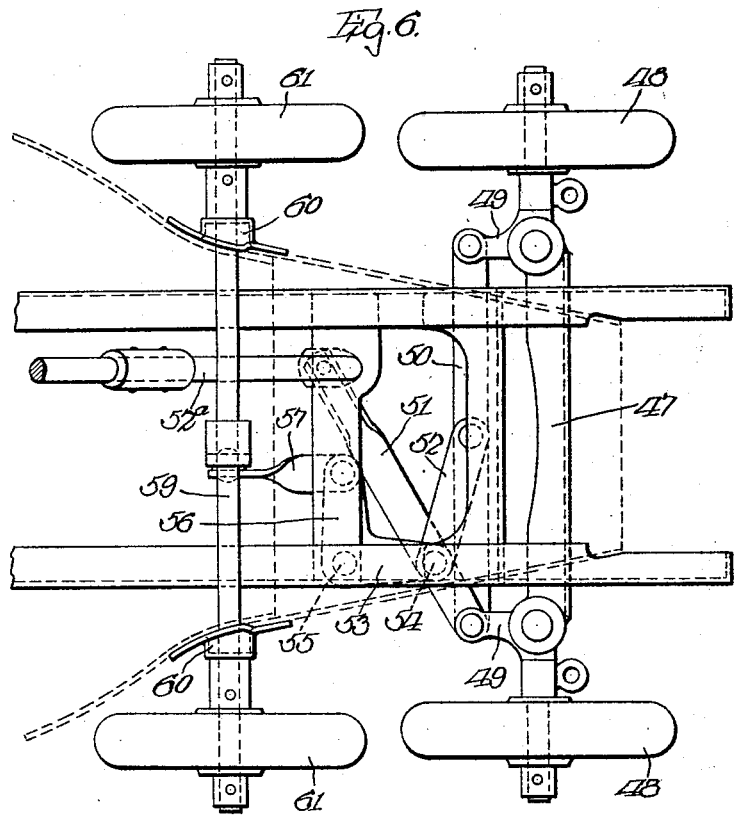
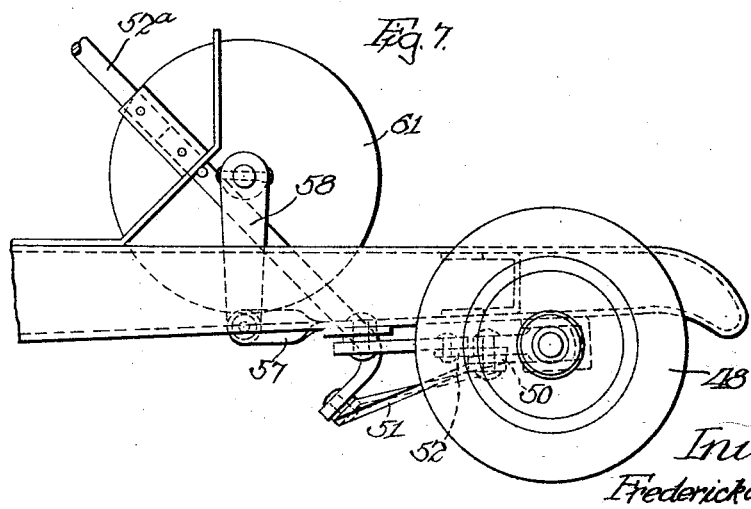
Inventor:
Frederick A. Lundahl
George T. Haight
Atty.

Patented June 2, 1931

1,808,310

UNITED STATES PATENT OFFICE

FREDERICK A. LUNDAHL, OF EAST MOLINE, ILLINOIS; MARIE LUNDAHL, EXECUTRIX OF SAID FREDERICK A. LUNDAHL, DECEASED, ASSIGNOR TO BUDDY "L" MFG. CO., OF EAST MOLINE, ILLINOIS, A CORPORATION OF ILLINOIS

VEHICLE TOY

Application filed April 22, 1927. Serial No. 185,865.

This invention relates to vehicle toys.

An object of the invention is to provide a toy vehicle in simulation of a full size vehicle such as a motor coach, or the like, which has front and rear wheels, steering mechanism, and a steering wheel disposed within the closed body of the vehicle, and including spare wheels carried upon the exterior of the body of the vehicle which are connected to the steering mechanism so that the latter may be operated through movement of the spare wheels from the exterior of the vehicle, whereby a child may lie upon the roof of the closed body portion of the vehicle and ride thereon, with the spare wheels arranged so as to be conveniently operated by the child to steer the toy, in this manner providing an exact replica of a full size vehicle including the steering wheel inside of the closed body, spare wheels upon the exterior of the body, and steering mechanism which may be operated without the necessity of attempting to steer the vehicle from the wheel within the closed housing.

A more particular object of the invention is to provide a toy vehicle equipped with spare wheels arranged upon the exterior of the vehicle which form part of the steering mechanism of the vehicle, said mechanism also including steering knuckles upon which the front wheels are mounted, a connecting rod for said knuckles, and operative connections between the spare wheels and the connecting rod whereby manipulation of the spare wheels effects reciprocation of the connecting rod and steering of the vehicle; and further to provide operative connections which are so arranged as to avoid accidental deflection of the front wheels of the vehicle should the same strike an obstruction.

Other and further objects of the invention will more clearly appear from the description and claims hereinafter following.

In the drawings forming a part of this specification, Figure 1 is a side elevational view of a toy vehicle made up in accordance with the invention. Figure 2 is a front elevational view of said vehicle. Figure 3 is a top plan view of a fragment of the vehicle, showing portions of the structure broken away to more clearly disclose parts of the invention. Figure 4 is an enlarged top plan view of the forward portion of the vehicle showing my invention utilized in connection therewith. Figure 5 is a side elevational view of the portion of the vehicle shown in Figure 4. Figure 6 is a top plan view of the vehicle similar to Figure 4, and showing a slightly different embodiment of the invention. And Figure 7 is a side elevational view of the portion of the vehicle disclosed in Figure 6.

As shown in the drawings, 10 represents a body portion, made up of heavy sheet metal, 11—11 denote sheet metal flanged webs or posts which support the roof or top 12 of the vehicle. The rear end of the body portion 10 is closed as indicated at 13, and the forward portion thereof is provided with doors indicated at 14, having an opening 15. Seats 16—16 are mounted within the closed body portion as shown. The forward end of the body portion is provided with a windshield structure 17, and forwardly of the wind-shield structure the body portion has a hood 18 secured thereto, the body portion 10, including all of the appurtenances mentioned, being mounted upon a frame or chassis 19, the rear portion of which carries wheels 20. The forward portion of the frame or chassis 19 carries a front bolster with which the front wheels and steering mechanism are associated as hereinafter described.

All of the various parts of the vehicle above described are made up of heavy gauge sheet metal, the parts being separately formed by stamping out the sheet metal, and the whole fabricated together by spot-welding the various parts in position, thereby building up a toy which is a replica of a full sized vehicle of this type. The vehicle so produced is approximately 25 inches in length, 8 inches in width and approximately 10 inches in height, and by reason of the sheet metal spot-welded construction the vehicle is able to sustain weights in excess of three hundred pounds. A vehicle of this type is especially designed to simulate a full sized vehicle of the type desired, and is provided with no mechanical means of locomotion, but is adapted to be pulled or drawn by the child; and in addition has an important use in that the child will rest in a reclining position upon the roof 12 of the vehicle and coast upon down grades, and frequently propel the vehicle manually by thrusting out his feet or hands into contact with the surface over which the vehicle is travelling.

Under these conditions it is necessary that efficient means be provided by which the vehicle may be steered while in motion, and this invention contemplates a vehicle and steering mechanism, which so far as external appearance is concerned, are identically similar to a vehicle with the usual steering wheel disposed within the closed body thereof and spare tires or wheels arranged upon the outside of the vehicle, mechanism being provided for steering the vehicle through manipulation of the spare wheels outside of the vehicle. These spare wheels or tires are in more convenient reach of a child reclining upon the roof of the vehicle, than the usual steering wheel inside of the closed body which would necessitate the child opening the door 14 and inserting his hand into the body portion in order to grasp the usual steering wheel, or attempting to thrust his hand through the relatively small opening 15 in the doors 14.

The steering mechanism includes an axle 21 which is rigidly secured by spot-welding or the like to the under surfaces of the members forming the frame 19, and best shown in Figures 4 et seq. Pivotally mounted at the outer ends of the axle 21 as indicated at 22—22 are steering knuckles 23—23, each of which includes a spindle 24 upon which is mounted a front wheel 25. Each knuckle also includes a rearwardly extending arm 26, the arms of both steering knuckles being pivotally connected to the ends of a connecting rod 27. The steering knuckles are also provided with eyelets to which pulling cords may be attached. Pivotally connected to one of the steering knuckles is a link 28, the opposed end of which is pivotally connected to an angular portion 29 formed upon the bottom of the steering post 30 which is suitably mounted in the foot-board 31 of the vehicle so that the upper end thereof extends into the closed body portion, the upper end of the post having a steering wheel 32 secured thereto.

The steering wheel 32, post 30, crank 29 and link 28, in the embodiment of the invention now being described have no function in steering the vehicle, but simulate the usual steering mechanism of a vehicle, and these parts are freely movable in unison with the operating mechanism by which the actual steering of the vehicle is effected, the parts enumerated being normally held against movement by connection with said mechanism.

The steering mechanism proper which may be operated from the exterior of the vehicle, includes a cross piece 33 secured to the frame 19 of the vehicle, and pivotally connected to the cross piece 33 at a point substantially midway between its ends is a lever 34. The forward end of the lever 34 is provided with a slot indicated at 35 adapted for the reception of a pin 36 secured to the connecting rod 27. The rear end of the lever 34 is extended upwardly as indicated at 37, and is provided with a forked portion 38 which pivotally engages a pin 39 formed upon a nut 40, there being a collar 41 interposed between the furcations of the member 38, with a pin 42 extending through the collar 41 and the post 39. The nut 40 is provided with an internal thread meshing with a threaded member 43 keyed upon a cross shaft 44 which is mounted in brackets 45—45 secured to the walls of the closed body portion at a point slightly to the rear of the hood 18, and keyed to the outer ends of the cross shaft 44 are wheels 46—46, which are of a character to represent spare wheels or tires for the vehicle.

When a child lies upon the roof of the vehicle, and the same is in motion, he may grasp either of the wheels 46—46 and by rotating the same, say for instance in a clockwise direction, through the engagement of the thread on the cross shaft with the nut 40, the nut 40 will travel toward the right-hand wheel 46 effecting movement of the connecting rod through the medium of the lever 34 in the opposite direction, bringing abut movement of the knuckles 23—23 to deflect the course of the vehicle. Movement of either of the wheels 46—46 in a counter-clockwise direction moves the front wheels 25 by reverse transverse travel of the nut 40 with reference to the cross shaft 44.

Due to the fact that nut 40 can be moved along the shaft 44 only when the latter is rotated through manipulation of the wheels 46—46, swinging of the lever 34 is prevented, which in turn prevents accidental deflection of the front wheels of the vehicle should the front wheels strike an obstruction.

Referring now to Figures 6 and 7 of the drawings, a slightly different embodiment of the invention is disclosed. In this arrangement the front axle 47, the front wheels 48—48, the steering knuckles 49—49, the connecting rod 50, link 51, the steering post 52$^a$ and steering wheel 65, correspond exactly to the front axle 21, the front wheels 25—25, the steering knuckles 26—26, connecting rod 27, the link 28, the steering post 30, and the steering wheel 32, heretofore described. The side steering mechanism in the embodiment of the invention shown in Figures 6 and 7, comprises a link 52 pivotally connected centrally to the connecting rod 50, extends laterally, and the free end thereof is pivotally connected to the outer end of one arm 53 of a bell crank lever, as indicated at 54, the elbow of the bell crank lever being pivotally secured to the adjacent frame member as indicated at 55. The other arm 56 of the bell crank lever has its free end connected by means of a link 57 with a crank arm 58 which is rigidly secured to a cross shaft 59, the ends of the cross shaft 59 being rotatably mounted in the brackets 60—60 on the side walls of the vehicle. Secured to the outer ends of the cross shaft 59 are the spare wheels or tires 61—61. In this construction, rotation of either of the wheels 61—61 through the shaft 59 effects swinging movement of the crank 58 which in turn, through the link 57, operates the bell crank lever, which reciprocates the connecting rod 50 through the medium of the connecting link 52. In this arrangement steering may be effected either through manipulation of the steering wheel 65, or through the side wheels 61—61.

By the above described invention it will be appreciated that there is provided a toy vehicle having such properties that a child may rest in a reclining position upon the top thereof, and coast upon the vehicle, and steer the same by grasping the spare wheels connected to the steering mechanism. In this connection, it will be understood that although I have disclosed the invention applied to a bus type of vehicle, the invention is adapted for use in connection with other types of vehicles, and further, that although the steering mechanism is adapted to be operated through the spare wheels as shown in the drawing, the steering mechanism may be so arranged that other portions of the vehicle might be utilized instead of the spare wheels, and connected to the steering mechanism, without departing from the spirit of the invention.

While I have herein shown and described what I consider the preferred manner of carrying out the invention, the same is merely illustrative, and I contemplate all changes and modifications which come within the scope of the claims appended hereto.

I claim:

1. In a toy of the character described, the combination with a wheeled vehicle made up of sheet metal fabricated to provide great strength and predetermined size, and having a closed body provided with a top adapted to support an individual in recumbent position thereon; a steering wheel arranged inside of said closed body portion; spare equipment carried on said vehicle exteriorly of the closed body portion thereof within reach of an individual while resting upon the top of said vehicle; and means connecting said equipment with the front wheels of the vehicle whereby manipulation of said spare equipment effects steering of the vehicle.

2. In a toy of the character described, the combination with a wheeled vehicle made up of sheet metal fabricated to provide a replica of a commercial vehicle, of predetermined size and great strength, and provided with a closed body portion adapted to support a person in recumbent position on the top thereof, said vehicle being provided with equipment corresponding to equipment usually mounted upon a commercial vehicle, said equipment being arranged exteriorly of said closed body portion, and disposed within convenient reach of the person reclining upon the top of said vehicle; and means connecting said equipment with the front wheels of the vehicle, whereby manipulation of said equipment effects steering of the vehicle.

3. In a toy of the character described, the combination with a wheeled vehicle made up of sheet metal fabricated to provide strength and predetermined size, and having a closed body portion, the top of which is adapted to support an individual in recumbent position thereon; a shaft extending transversely through said vehicle and rotatably mounted therein; a spare wheel secured to each end of said shaft; and means connecting said shaft with the front wheels of the vehicle whereby rotation of said shaft through manipulation of said spare wheels effects steering of said vehicle.

4. In a toy of the character described, the combination with a wheeled vehicle of considerable length and predetermined size, and having a closed body provided with a top adapted to support an individual in recumbent position thereon; a steering wheel arranged inside of said closed body portion; spare equipment carried on said vehicle exteriorly of the closed body portion within reach of an individual while resting upon the top of said vehicle; and means connecting said equipment with the front wheels of the vehicle whereby manipulation of said spare equipment effects steering of the vehicle.

5. A wheeled vehicle of the character described, having seating and steering means, and a body enclosing said seating and steering means; and spare equipment mounted on each side of said vehicle exteriorly of said body, said spare equipment being operatively and jointly connected with the steering wheels of said vehicle to provide additional steering means adapted to be manipulated by an individual positioned outside of said enclosing body.

6. A wheeled vehicle of the character described, having steering mechanism and seating means; a body of the bus type enclosing said seating means and steering mechanism; and wheels connected for joint operation mounted exteriorly of said bus body on opposite sides thereof and operatively connected with the steering wheels to provide additional means for steering said vehicle.

7. A wheeled vehicle of the character described, having seating and steering means, and a body portion enclosing said seating and steering means; spare tire equipment mounted at opposite sides of said enclosing body exteriorly thereof; and means for connecting said spare tire equipment to the steering wheels of said vehicle.

8. In a toy vehicle having front and rear wheels and a closed body preventing access to steering mechanism as ordinarily located within said body, a cross-shaft extending through said body and projecting from the same at opposite sides thereof, spare wheels fixed to the projecting ends of said cross-shaft, means connecting said cross-shaft to the front wheels of the vehicle whereby manipulation of said spare wheels effects steering of the vehicle, and steering means within the body and connected with said vehicle wheels for independently operating said vehicle wheels.

In witness that I claim the foregoing I have hereunto subscribed my name this 19th day of April, 1927.

FREDERICK A. LUNDAHL.